United States Patent
Manginen et al.

(10) Patent No.: US 9,889,890 B1
(45) Date of Patent: Feb. 13, 2018

(54) VEHICLE HOOD SYSTEM

(71) Applicant: FORD GLOBAL TECHNOLOGIES, LLC, Dearborn, MI (US)

(72) Inventors: Danny P. Manginen, Canton, MI (US); Mark Joseph Courtright, Allen Park, MI (US); Michael J. Gardynik, Farmington Hills, MI (US); Matthew Brooke, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/411,479

(22) Filed: Jan. 20, 2017

(51) Int. Cl.
  *B62D 25/12* (2006.01)
  *B62D 25/08* (2006.01)
  *B60R 13/08* (2006.01)
  *B60R 21/34* (2011.01)

(52) U.S. Cl.
  CPC .......... *B62D 25/12* (2013.01); *B60R 13/0838* (2013.01); *B60R 21/34* (2013.01); *B62D 25/082* (2013.01); *B60R 2021/343* (2013.01)

(58) Field of Classification Search
  CPC .................................. B62D 5/10; B62D 5/105
  See application file for complete search history.

(56) References Cited

U.S. PATENT DOCUMENTS 8,016,347 B2 * 9/2011 Uchino ................... B60R 21/34
                                                      180/69.21
8,356,857 B2    1/2013 Ralston et al.
9,174,682 B2   11/2015 Schmitz et al.

FOREIGN PATENT DOCUMENTS

FR             2952392 A1    5/2011

* cited by examiner

*Primary Examiner* — John D Walters
*Assistant Examiner* — James J Triggs
(74) *Attorney, Agent, or Firm* — Jason Rogers; Brooks Kushman P.C.

(57) ABSTRACT

A vehicle includes a hood that is rotatably secured to a vehicle body. The hood has an upper panel, a lower panel, and a reinforcement member disposed therebetween. The reinforcement member has a baseplate and a tab. The baseplate is secured to an internal surface of the lower panel. The tab has a proximal end that is secured to the baseplate and a distal end that extends away from the baseplate and is secured to an internal surface of the upper panel.

17 Claims, 2 Drawing Sheets

VEHICLE HOOD SYSTEM

TECHNICAL FIELD

The present disclosure relates to hood structures for vehicles such as automobiles and trucks.

BACKGROUND

Automobiles may include compartments for housing various components of the vehicle. For example, automobiles may include an engine compartment that houses an engine and other powertrain components. Access may be obtained to these various compartments by transitioning a door or cover, such as a hood to an engine compartment, to an open position.

SUMMARY

A vehicle includes a hood that is rotatably secured to a vehicle body. The hood has an upper panel, a lower panel, and a reinforcement member disposed therebetween. The reinforcement member has a baseplate and a tab. The baseplate is secured to an internal surface of the lower panel. The tab has a proximal end that is secured to the baseplate and a distal end that extends away from the baseplate and is secured to an internal surface of the upper panel.

A vehicle hood includes an upper panel, lower panel, and reinforcement member. The upper panel is secured to the lower panel and defines a cavity therebetween. The reinforcement member is disposed within the cavity. The reinforcement member has a baseplate and a tab. The baseplate is secured to an internal surface of the lower panel. The tab has a proximal end secured to the baseplate and a distal end that extends away from the baseplate and is secured to an internal surface of the upper panel.

A vehicle includes a body and hood. The body defines an engine compartment. The hood is rotatably secured to the body and is configured to conceal the engine compartment when in a lowered position. The hood has an upper panel, a lower panel, and a reinforcement member disposed therebetween. The reinforcement member has a baseplate and a tab. The baseplate is secured to an internal surface of the lower panel. The tab extends from the baseplate and is secured to an internal surface of the upper panel.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
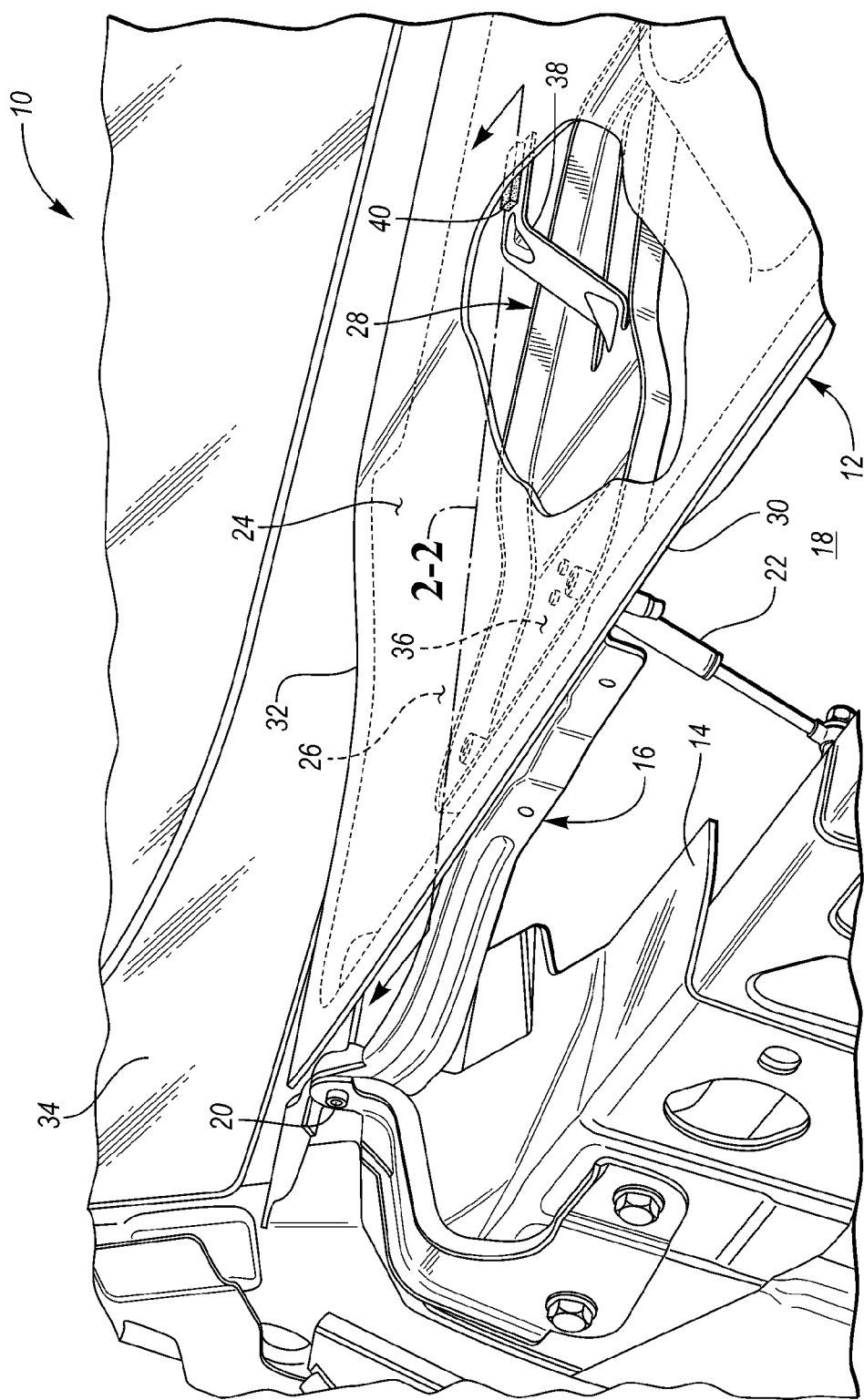
FIG. 1 is a perspective view of a vehicle having a hood that is configured to conceal an engine compartment.

Referring to FIG. 1, a vehicle 10 having a hood 12 is illustrated. The hood 12 is rotatably secured to a body or frame 14 of the vehicle 10. The hood 12 may be rotatably secured to the frame 14 by a hinge mechanism 16. The vehicle 10 may also include a fender that is disposed on the exterior of the vehicle 10 which will conceal the portion of the frame 14 that the hinge mechanism 16 is secured to. The fender is not shown so that connections between the hood 12 and the frame 14, including the hinge mechanism 16, may be observed. The hood 12 may transition between a lowered position that is configured to conceal the engine compartment 18 and a raised position that is configured to provide access to the engine compartment 18. The hood may transition between the lowered position and the raised position when rotated about a pivot 20 that is part of the hinge mechanism 16. A strut 22 may be rotatably secured to both the hood 12 and the frame 14. The strut 22 may extend between the hood 12 and the frame 14. The strut 22 may include a piston that slides within a pressurized cylinder that is configured to generate a force to maintain the raised position of the hood 12.

The hood 12 may include an upper panel 24 and a lower panel 26. The upper panel 24 may alternatively be referred to as the external panel or outer panel. The lower panel 26 may alternatively be referred to as the internal panel or inner panel. A reinforcement member 28 may be disposed between the upper panel 24 and the lower panel 26. The upper panel 24 and lower panel 26 may be made from a sheet metal material, while the reinforcement member 28 may be made from sheet metal, plastic, or a composite material such as a carbon fiber reinforced plastic. The reinforcement member 28 may be located proximate to a lateral edge 30 of the hood 12. Reinforcement member 28 may also be located proximate to a back edge 32 of the hood 12, which is located proximate to a windshield 34. The reinforcement member 28 may include a baseplate 36 and a tab 38 that extends away from the baseplate 36. The baseplate 36 and the tab 38 may be made from a common stock material (such as the same sheet metal plate). The tab 38 and shape of the baseplate 36 may be produced by a stamping process.

A mastic patch 40 may be disposed between the tab 38 and the upper panel 24 of the hood 12. The mastic patch 40 may consist of a dampening material. The tab 38 may provide support for the upper panel 24 to prevent the upper panel 24 from buckling or bending. The tab 38 may also protect a pedestrian who comes into contact with the upper panel 24 of the hood 12 by decelerating the upper panel 24 in the event of an impact with the pedestrian. The mastic patch 40 may prevent any hard contact between the upper panel 24 and the tab 38. The mastic patch 40 may also act to reduce vibrations that may be occurring within the various components of the hood 12. More specifically, the mastic patch 40 may prevent the upper panel 24 from vibrating as a result of external forces (i.e., wind, rough road input, rain, etc.) being applied to the upper panel 24.

Figure 2:
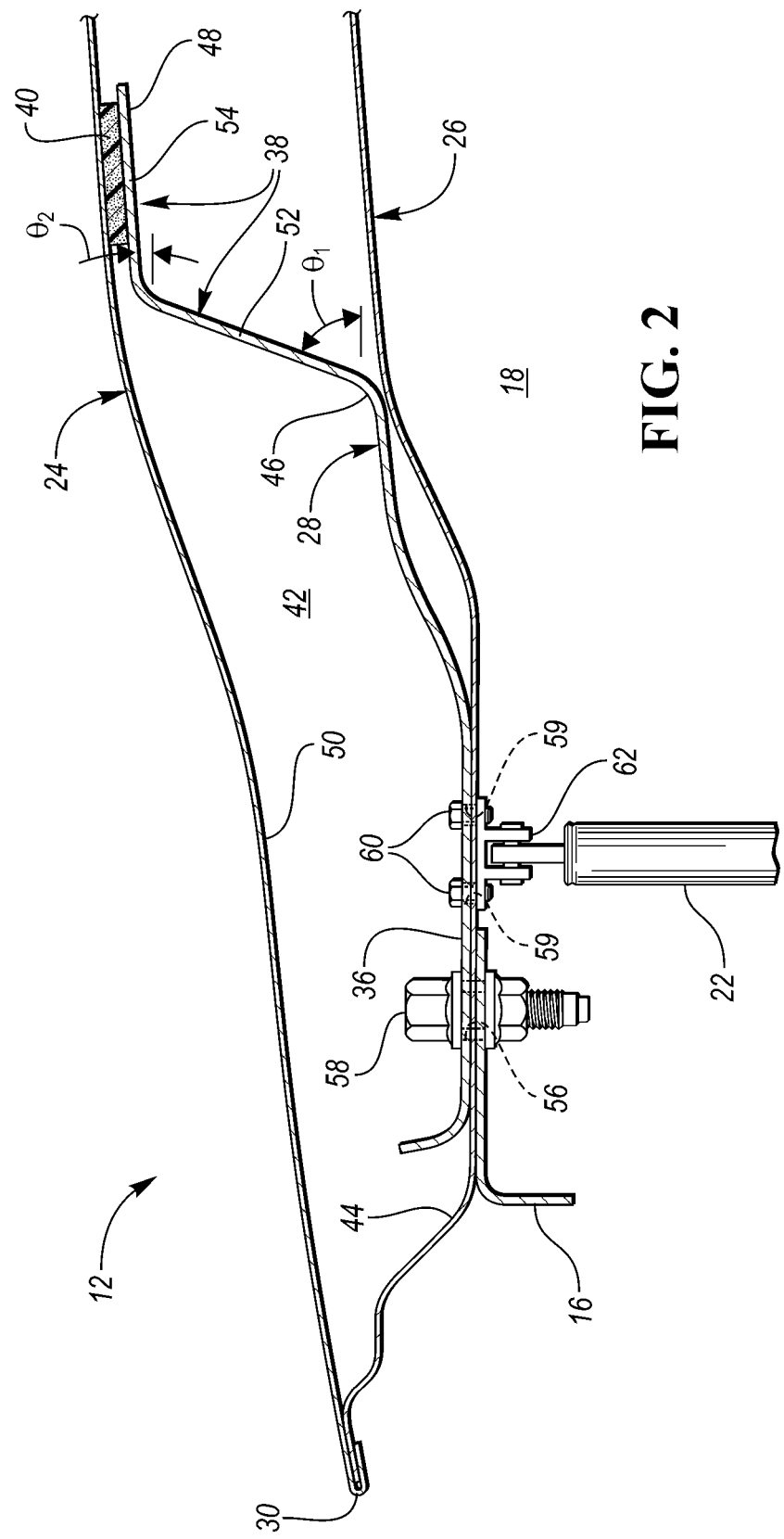
FIG. 2 is a cross-sectional view taken along line 2-2 in FIG. 1.

Referring to FIG. 2, a cross-sectional view of the hood 12 taken along line 2-2 in FIG. 1 is illustrated. The upper panel 24 is secured to the lower panel 26. The upper panel 24 may be secured to the lower panel 26 along the lateral edge by folding the sheet metal of the upper panel 24 around the sheet metal of the lower panel 26. Alternatively, the upper panel 24 may be secured to the lower panel 26 by fasteners, crimping, or any other known sheet metal attachment method known to a person of ordinary skill in the art. Fasteners may include bolts, screws, rivets, or any other fastener known to a person of ordinary skill in the art. The upper panel 24 and the lower panel 26 may define a cavity 42 therebetween. The reinforcement member 28 may be disposed within the cavity 42 between the upper panel 24 and the lower panel 26. The baseplate 36 of the reinforcement member 28 may be secured to an internal surface 44 of the lower panel 26. The tab 38 may have a proximal end 46 that is secured to the baseplate 36. The tab 38 may also have a distal end 48 that extends away from the baseplate 36. The mastic patch 40 may be disposed between the distal end 48 of the tab 38 and an internal surface 50 of the upper panel 24. Alternatively, the distal end 48 may be directly secured to the internal surface 50 of the upper panel 24.

The tab 38 includes a first section (or first arm) 52 that extends upward from the baseplate 36 at a first angle $\theta_1$ relative to the baseplate 36. The first angle $\theta_1$ may be perpendicular or have a non-perpendicular value including any incremental value that is in-between 0° and 90°. The first angle $\theta_1$ may be such that the first section 52 of the tab 38 extends upward and away from the lateral edge 30 of the hood 12. The tab 38 may also include a second section (or second arm) 54 that extends from the first section 52. The second section 54 may extend from an end of the first section 52 that is opposite relative to another end of the first section 52 that is secured to the baseplate 36. The second section 54 may extend from the first section 52 at a second angle $\theta_2$ relative to the baseplate 36. The second angle $\theta_2$ may be less than the first angle $\theta_1$. The second angle $\theta_2$ may have a non-perpendicular value that includes any incremental value from 0° to 45°. The tab 38 may be a biasing element that applies a force to the internal surface 50 of the upper panel 24.

The baseplate 36 may define at least one orifice 56. The hinge mechanism 16 may be secured to the hood 12 by at least one fastener 58 that passes through or engages the orifice 56. More specifically, the at least one fastener 58 may pass through or engage the orifice 56 in the baseplate 36, an orifice in the lower panel 26, and an orifice in the hinge mechanism 16. The at least one fastener 58 may be a bolt that engages a nut. Alternatively, the at least one fastener 58 may be a screw, rivet, or any other type fastener known to a person of ordinary skill in the art. The reinforcement member 28 may be located proximate to the lateral edge 30 of the hood 12 such that the at least one orifice 56 is defined between the tab 38 and the lateral edge 30 of the hood 12.

The baseplate 36 may also define a set of orifices 59. The strut 22 may be secured to the hood 12 by a set of fasteners 60 that pass through or engage the set of orifices 59. More specifically, the set of fasteners 60 may pass through or engage the set of orifices 59 in the baseplate 36, a set of orifices in the lower panel 26, and a set of orifices in a support bracket 62 that rotatably secures the strut 22 to the hood 12. The set of fasteners 60 may be bolts that engage nuts. Alternatively, the set of fasteners 60 may be screws, rivets, or any other type fasteners known to a person of ordinary skill in the art. The reinforcement member 28 may be located proximate to the lateral edge 30 of the hood 12 such that the set of orifices 59 are defined between the tab 38 and the lateral edge 30 of the hood 12.

The hood structure depicted in FIGS. 1 and 2 should not be construed as limiting. The reinforcement member 28 may include a different shape. For example, the tab 38 may extend toward, and not away from, the lateral edge 30 of the hood 12. A second reinforcement member and second mastic patch may be disposed between the upper panel 24 and lower panel 26 proximate to a second lateral edge 30 of the hood 12 and the back edge 32 of the hood 12. The second reinforcement member may be a mirror image of the first reinforcement member 28. The second reinforcement member may provide support for a second hinge mechanism and a second strut that are located proximate to the second lateral edge of the hood 12, where the second hinge mechanism and the second strut are secured to both the hood 12 and the frame 14. Furthermore, similar reinforcement members (that include a baseplate secured to the lower panel 26 and a tab that extends upwards to the upper panel 24) may be disposed between the upper panel 24 and lower panel 26 proximate to a front edge of the hood 12. A reinforcement member located proximate to a front edge of the hood 12 may include orifices on a baseplate that are configured to receive fasteners to mount a striker that is part of a latching mechanism. A reinforcement member proximate to a front edge of the hood 12 may provide additional structural support for a latching mechanism while also preventing oil canning of the upper panel and reducing vibrations in the same manner as the reinforcement member 28, described above.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a hood rotatably secured to a body, the hood having upper and lower panels and a reinforcement member disposed therebetween, the reinforcement member having a baseplate secured to an internal surface of the lower panel and a tab having proximal and distal ends secured to the baseplate and an internal surface of the upper panel, respectively; and
   a strut secured to the body and baseplate at first and second ends, respectively.

2. The vehicle of claim 1, wherein the tab includes a first section that extends upward from the baseplate at a non-perpendicular angle relative to the baseplate and a second section that extends from the first section opposite of the baseplate at a second angle, the second section having an upper surface that is secured to the internal surface of the upper panel.

3. The vehicle of claim 1, wherein the baseplate defines at least one orifice and the hood is rotatably secured to the body by a hinge that is affixed to the baseplate by at least one fastener that engages the at least one orifice.

4. The vehicle of claim 3, wherein the reinforcement member is located proximate to a lateral edge of the hood such that the at least one orifice is defined between the tab and the lateral edge.

5. The vehicle of claim 4, wherein the tab extends from the baseplate at an angle this is both upwards and away from the lateral edge.

6. The vehicle of claim 1, further comprising a mastic patch disposed between the distal end of the tab and the internal surface of the upper panel.

7. A vehicle hood comprising:
an upper panel secured to a lower panel and defining a cavity therebetween; and
a reinforcement member disposed within the cavity, the reinforcement member having a baseplate secured to an internal surface of the lower panel and a tab having a proximal end secured to the baseplate and a distal end that extends away from the baseplate and is secured to an internal surface of the upper panel, wherein the baseplate defines at least one orifice configured to receive at least one fastener to affix a hinge to the baseplate.

8. The hood of claim 7, wherein the tab includes a first section that extends upward from the baseplate at a non-perpendicular angle relative to the baseplate and a second section that extends from the first section opposite of the baseplate at a second angle, the second section having an upper surface that is secured to the internal surface of the upper panel.

9. The hood of claim 7, wherein the reinforcement member is located proximate to a lateral edge of the hood such that the at least one orifice is defined between the tab and the lateral edge.

10. The hood of claim 9, wherein the tab extends from the baseplate at an angle this is both upwards and away from the lateral edge.

11. The hood of claim 7, further comprising a mastic patch disposed between the distal end of the tab and the internal surface of the upper panel.

12. A vehicle comprising:
a body defining an engine compartment; and
a hood rotatably secured to the body and configured to conceal the engine compartment when in a lowered position, the hood having upper and lower panels and a reinforcement member disposed therebetween, the reinforcement member having a baseplate secured to an internal surface of the lower panel and a tab extending from the baseplate and secured to an internal surface of the upper panel, wherein the baseplate defines at least one orifice and the hood is rotatably secured to the body by a hinge that is affixed to the baseplate by at least one fastener that engages the at least one orifice.

13. The vehicle of claim 12, wherein the tab includes a first section that extends upward from the baseplate at a non-perpendicular angle relative to the baseplate and a second section that extends from the first section opposite of the baseplate at a second angle, the second section having an upper surface that is secured to the internal surface of the upper panel.

14. The vehicle of claim 12 wherein the reinforcement member is located proximate to a lateral edge of the hood such that the at least one orifice is defined between the tab and the lateral edge.

15. The vehicle of claim 14, wherein the tab extends from the baseplate at an angle this is both upwards and away from the lateral edge.

16. The vehicle of claim 12, further comprising a strut that is secured to the vehicle body at a first end and the baseplate at a second end.

17. The vehicle of claim 12, further comprising a mastic patch disposed between a distal end of the tab and the internal surface of the upper panel.

* * * * *